(12) United States Patent
Maddali et al.

(10) Patent No.: US 10,432,120 B2
(45) Date of Patent: Oct. 1, 2019

(54) AUTOMATIC FAULT ISOLATION METHODOLOGY

(75) Inventors: Vijay K. Maddali, Rockford, IL (US); Jeffrey D. Myroth, Roscoe, IL (US); Jef William Good, German Valley, IL (US); Shane R. Traser, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 2018 days.

(21) Appl. No.: 13/447,266

(22) Filed: Apr. 15, 2012

(65) Prior Publication Data

US 2013/0271878 A1 Oct. 17, 2013

(51) Int. Cl.
*H02H 3/00* (2006.01)
*H02P 9/10* (2006.01)
*H02H 3/06* (2006.01)
*H02H 7/06* (2006.01)

(52) U.S. Cl.
CPC ............. *H02P 9/10* (2013.01); *H02H 3/06* (2013.01); *H02H 7/06* (2013.01)

(58) Field of Classification Search
USPC .......................... 361/20, 52, 54, 59, 67, 258
See application file for complete search history.

(56) References Cited

U.S. PATENT DOCUMENTS

| 2,336,836 A | 12/1943 | Bany |
| 3,234,397 A * | 2/1966 | Park .................. F01D 17/24 |
| | | 290/40 R |
| 3,683,199 A * | 8/1972 | Billings ................ H02H 7/062 |
| | | 307/57 |
| 4,208,693 A | 6/1980 | Dickens et al. |
| 4,245,182 A | 1/1981 | Aotsu et al. |
| 4,443,828 A | 4/1984 | Legrand et al. |
| 5,422,778 A | 6/1995 | Good et al. |
| 5,488,532 A | 1/1996 | Mrowiec et al. |
| 5,495,381 A | 2/1996 | Mrowiec et al. |
| 5,701,070 A * | 12/1997 | Schultz ................ H02H 3/0935 |
| | | 322/27 |
| 5,710,170 A | 1/1998 | Guay et al. |
| 5,715,124 A * | 2/1998 | Votava ................... H02H 7/062 |
| | | 361/115 |
| 6,433,978 B1 | 8/2002 | Neiger et al. |

(Continued)

FOREIGN PATENT DOCUMENTS

| GB | 509261 A * | 7/1939 | ............... B66B 1/12 |
| GB | 1542719 A * | 3/1979 | ............. H02M 5/45 |

OTHER PUBLICATIONS

European Search Report for Application No. 13163489.1 dated Sep. 22, 2016.

*Primary Examiner* — Muhammad S Islam
(74) *Attorney, Agent, or Firm* — Carlson, Gaskey & Olds, P.C.

(57) ABSTRACT

A method and system for responding to a fast trip protective element trip in a generator system that re-excites the generator when a fast trip protection element trips and determines whether the generator immediately retrips the fast trip protection element, thereby determining whether a fault is located in the generator or in an attached load. If it is determined that the fault is located in the load, the system re-excites and reconnects the load after disabling the fast trip protection element for a specified period to allow for the load to clear its fault.

13 Claims, 2 Drawing Sheets

(56) References Cited

U.S. PATENT DOCUMENTS

| | | |
|---|---|---|
| 6,639,769 B2 | 10/2003 | Neiger et al. |
| 7,230,344 B2 * | 6/2007 | Pollack ................... H02J 9/066 290/38 R |
| 2007/0086124 A1 | 4/2007 | Elms et al. |
| 2012/0182648 A1 * | 7/2012 | Maddali ................ H02H 7/065 361/21 |

* cited by examiner

AUTOMATIC FAULT ISOLATION METHODOLOGY

BACKGROUND

Modern aircraft power generation systems often use variable frequency generators (VFGs). The VFGs are designed to carry required overloads at the lowest operating speeds of the VFGs. This results in the generator having a higher capacity at the highest operating speeds. As a result of this design consideration, some faults in a generator control unit or the generator can cause significant over voltages at higher operating speeds if the faults are not identified quickly.

To protect against such faults, fast trip protection devices are included in the generator and trip whenever an overvoltage is present. Due to the fast nature of the fast trip protection devices, it is also possible for nuisance trips to occur. A nuisance trip occurs when a fault is present in the load and the fast trip protection device falsely detects a fault in the generator. When a nuisance trip occurs, it is imprudent to disconnect the generator from the load and connect an alternate power source.

SUMMARY

Disclosed is a method for responding to a fast protective trip in a generator system having the step of re-exciting the generator when a fast trip protection element trips and determining whether the generator retrips the fast trip protection element.

Also disclosed is a method for responding to a fast trip protection trip device in a generator system comprising detecting a fast trip protection element tripping, isolating a generator from a load by opening a generator line contactor, de-exciting the generator, re-exciting the generator while the generator line contactor is open, connecting the load to an alternate power source when the generator retrips, determining the fast trip protection element trip is a nuisance trip when the generator re-excites without tripping the fast trip protection element, temporarily disabling the fast trip protection element when the trip is a nuisance trip, re-exciting the generator when the trip is a nuisance trip, reconnecting the generator to the load by closing the generator line contactor when the trip is a nuisance trip, re-enabling the fast trip protection element after a pre-determined duration when the trip is a nuisance trip.

A power supply is defined as a generator and a generator line connection connecting the generator to a power distribution bus. The power distribution bus is operable to distribute power to at least one load. A fast trip protection device is incorporated into the generating source such that the fast trip protection device can detect a fault and open the generator line connection when a fault is detected. A controller is operable to control the generator and the fast trip protection device. The controller further has a computer readable means storing instructions for causing the power supply to perform the step of re-exciting the generator when a fast trip protection element trips and determining whether the generator immediately retrips the fast trip protection element.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
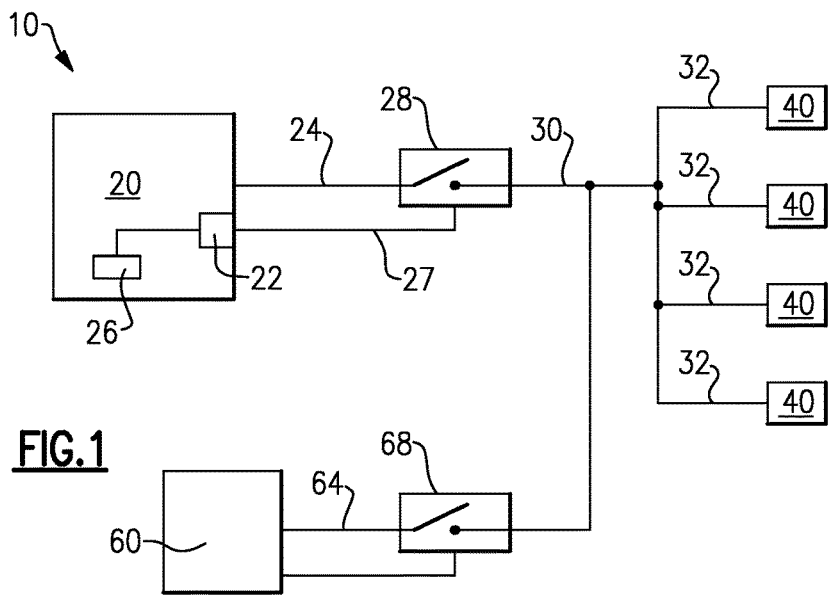
FIG. 1 illustrates a single channel power distribution system.

FIG. 1 illustrates a single channel power distribution system 10 having a single generator 20 acting as a power source. The generator 20 includes a fast trip protection device 22 and a controller 26. A power output feeder 24 delivers electric power from the generator 20 to a power distribution bus 30 through a generator contactor 28. The generator contactor 28 is controlled via a signal line 27 from the fast trip protection device 22. Multiple loads 40 are connected to the power distribution bus 30 and receive operational power from the power distribution bus 30 via power connections 32. Typically, a second generator 60 driven by an Auxiliary Power Unit (APU) provides a backup power source. The second generator 60 is connected to the power distribution bus 30 via a generator contactor 68. The power output feeder 64 provides power from the second generator 60 to the generator contactor 68 through line contactor 68.

Figure 2:
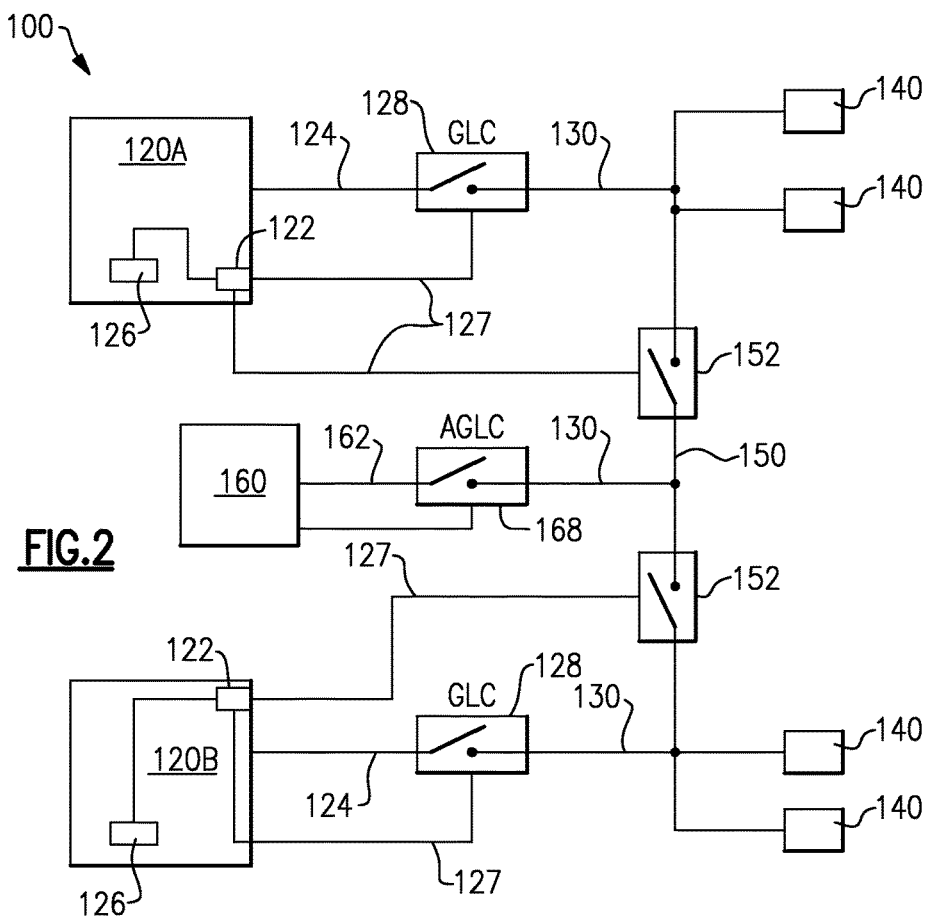
FIG. 2 illustrates a two channel power distribution system.

FIG. 2 illustrates an alternate two channel configuration for a power distribution system 100. As with the power distribution system 10 of FIG. 1, each channel of the power distribution system 100 has a generator 120a, 120b, with a controller 126, and a fast trip protection device 122. Each channel includes a power distribution bus 130 that provides power to multiple loads 140. Each generator 120a, 120b is connected to the corresponding power distribution bus 130 via a power output feeder 124, and a generator line control (GLC) switch 128. The GLC switch 128 is controlled using signal lines 127 from the fast trip protection devices 122.

The two channel configuration illustrated in FIG. 2 also includes a bus tie connector 150 connected to each power distribution bus 130 via a bus tie contactor 152. An auxiliary power unit 160 is also connected to the bus tie connector 150 via an auxiliary generator line control (AGLC) switch 168 and a power feeder 162. The bus tie contactor 152 can be controlled by switch control lines 127 from either of the fast trip protection devices 122 or an independent controller (not pictured).

Figure 3:
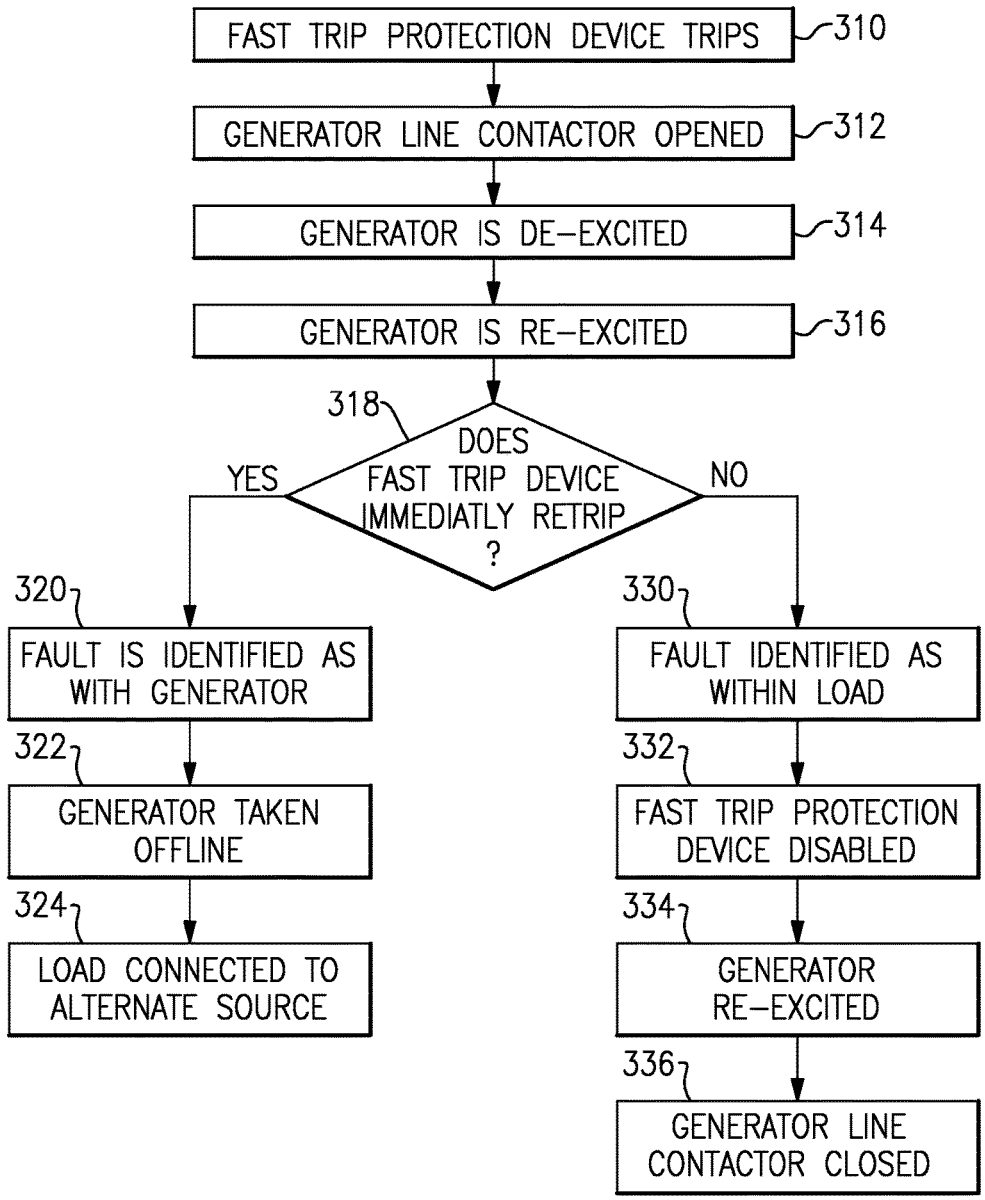
FIG. 3 illustrates an automatic fault isolation methodology that can be used with the illustrated examples of FIGS. 1 and 2.

With continued reference to FIGS. 1 and 2, FIG. 3 illustrates a mode of operation of the generator 20, 120a, 120b. Initially, the fast trip protection device 22, 122 detects a fault within the system 10, 100 and trips in a "fast trip protection device trips" at 310. The tripped fast trip protection device 22, 122 causes the controller 26, 126 to open the generator line contactor 28, 128, thereby isolating the generator 20, 120a, 120b from the loads 40, 140 in a "generator line contactor opened" at 312. Once isolated, the generator 20, 120a, 120b is de-excited (powered down) in a "generator is de-excited" at 314.

After being isolated and de-excited, the generator 20, 120a, 120b is re-excited in a "generator is re-excited" at 316 to determine if the fast trip protection device 22, 122 retrips while isolated from the loads 40, 140 at "does fast trip device immediately retrip?" at 318. If the fast trip protection device 22, 122 retrips, the generator controller 26, 126 determines that a fault exists within the generator 20, 120*a*, 120*b* in a "fault is identified as within generator" at 320. When a fault is identified within the generator 20, 120*a*, 120*b*, the generator 20, 120*a*, 120*b* is taken offline by the controller 26, 126 in a "generator taken off line" at 322. The controller 26, 126 then connects an alternate power source such as an APU 60, 160, or a second generator 120*a*, 120*b* channel to the loads 40 in a "load connected to alternate power source" at 324.

Alternately, if the fast trip protection device 22, 122 does not retrip when the generator 20, 120*a*, 120*b* is re-excited, the generator controller 26, 126 determines that the fault exists within the loads 140 and the tripping of the fast trip protection device 22, 122 was a nuisance trip in a "fault identified as within load" at 330. When a nuisance trip occurs, it is imprudent to disconnect a functioning generator 20, 120*a*, 120*b* as the generator is still able to provide power, and the loads 40, 140 containing the fault may need power to clear the fault. Thus, when a fault is identified as being within the load 40, 140, the controller 26, 126, temporarily disables the fast trip protection device 22, 122 in a "fast trip protection device disabled" at 332 and then generator 20, 120 is re-excited in a "generator is re-excited" at 334. The controller then closes the generator line contactor 28, thereby reconnecting the generator 20, 120*a*, 120*b* to the loads 40, 140 in a "generator line contactor closed" at 336. The fast trip protection is temporarily disabled to prevent the load fault from re-tripping the power system.

The duration of the temporary disablement of the fast trip protection is predetermined and stored within the controller 26, 126. Alternately, the duration can be determined a priori by the controller 26, 126 based on the number and types of connected loads 40, 140 at the time of the fault. Once the temporary disabling of the fast trip protection device has completed, the power distribution system 10, 100 is returned to its original state and the load is allowed to clear its fault.

It should be understood that like reference numerals identify corresponding or similar elements throughout the several drawings. It should also be understood that although a particular component arrangement is disclosed in the illustrated embodiment, other arrangements will benefit herefrom. Although particular step sequences are shown, described, and claimed, it should also be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A method for responding to a fast protective trip in a generator system comprising:
   re-exciting the generator when a fast trip protection element trips and determining whether said generator retrips the fast trip protection element; and
   determining said fast trip protection element trip is a nuisance trip when said generator re-excites without tripping the fast trip protection element.

2. The method of claim 1, further comprising: connecting a load to an alternate power source when said generator retrips the fast trip protection element.

3. The method of claim 1, further comprising: temporarily disabling said fast trip protection element.

4. The method of claim 1, further comprising: re-exciting said generator after disabling said fast trip protection element.

5. The method of claim 1, further comprising:
   detecting a fast trip protection element tripping;
   isolating a generator from a load by opening a generator line contactor; and
   de-exciting the generator.

6. The method of claim 3, further comprising: re-enabling said fast trip protection element after a pre-determined duration.

7. The method of claim 4, further comprising: reconnecting said generator to a load by closing a generator line contactor.

8. A method for responding to a fast trip protection trip device in a generator system comprising:
   detecting a fast trip protection element tripping;
   isolating a generator from a load by opening a generator line contactor;
   de-exciting the generator;
   re-exciting the generator while the generator line contactor is open;
   connecting said load to an alternate power source when said generator retrips;
   determining said fast trip protection element trip is a nuisance trip when said generator re-excites without tripping the fast trip protection element;
   temporarily disabling said fast trip protection element when said trip is a nuisance trip;
   re-exciting said generator when said trip is a nuisance trip;
   reconnecting said generator to said load by closing said generator line contactor when said trip is a nuisance trip; and
   re-enabling said fast trip protection element after a pre-determined duration when said trip is a nuisance trip.

9. A power supply comprising:
   a generator;
   a generator line connection connecting said generator to a power distribution bus, wherein said power distribution bus is operable to distribute power to at least one load;
   a fast trip protection device incorporated into said generator such that said fast trip protection device being configured to detect a fault and open said generator line connection when the fault is detected; and
   a controller operable to control said generator and said fast trip protection device, wherein said controller further comprises a computer readable means storing instructions for causing said power supply to perform the step of re-exciting the generator when a fast trip protection element trips and determining whether said generator immediately retrips the fast trip protection element and determining said fast trip protection element trip is a nuisance trip when said generator re-excites without tripping the fast trip protection element.

10. The power supply of claim 9, further comprising:
a second generator having a generator line connection connecting said second generator to a second power distribution bus and a fast trip protection device operable to open said generator line connection upon detection of a fault;
a bus tie connector operable to electrically connect each of said first power distribution bus and said second power distribution bus; and
a second generator controller operable to control said second generator and said second fast trip protection device, wherein said second controller further comprises a computer readable means storing instructions for causing said power supply to perform the step of re-exciting the second generator when a fast trip protection element trips and determining whether said second generator immediately retrips the second fast trip protection element.

11. The power supply of claim 9, further comprising an auxiliary power unit connected to said power distribution bus.

12. The power distribution system of claim 9, wherein said controller is a generator controller integral to said first generator.

13. The power distribution system of claim 9, wherein said controller is a generator controller external to said first generator.

* * * * *